United States Patent [19]
Schmaus et al.

[11] 3,732,733
[45] May 15, 1973

[54] DIRECT-ACTING PRESSURE AND VACUUM SENSOR

[75] Inventors: Siegfried H. A. Schmaus, Philadelphia, Pa.; Franklin G. Reick, Westwood, N.J.

[73] Assignee: said Schmaus by said Reick

[22] Filed: Sept. 3, 1971

[21] Appl. No.: 177,619

Related U.S. Application Data

[63] Continuation-in-part of Ser. No. 317, Jan. 2, 1970.

[52] U.S. Cl. ...................................... 73/418, 73/411
[51] Int. Cl. ................................................ G01l 7/04
[58] Field of Search ...................... 73/418, 411, 412, 73/417

[56] References Cited

UNITED STATES PATENTS 1,421,501 7/1922 Kraft et al. ............................ 73/396
3,603,153 9/1971 Schmaus ............................... 73/411

*Primary Examiner*—Donald O. Woodiel
*Attorney*—Michael Ebert

[57] ABSTRACT

A direct-acting pressure and vacuum gauge operable in the low-pressure range and constituted by two cantilever springs having different lengths and spring rates. The two springs have similar curved formations and are maintained in spaced relation one within the other, to define a pressure region therebetween. Both springs are attached at one end to a fixed input socket, the free ends of the springs terminating in a common head from which a pointer is extended. Disposed within the pressure region and abutting the inner walls of the springs, is a flexible bladder forming an internal chamber communicating with the socket, whereby fluid fed into the chamber causes the springs to deflect as a function of fluid pressure, thereby moving the pointer to indicate pressure.

9 Claims, 6 Drawing Figures

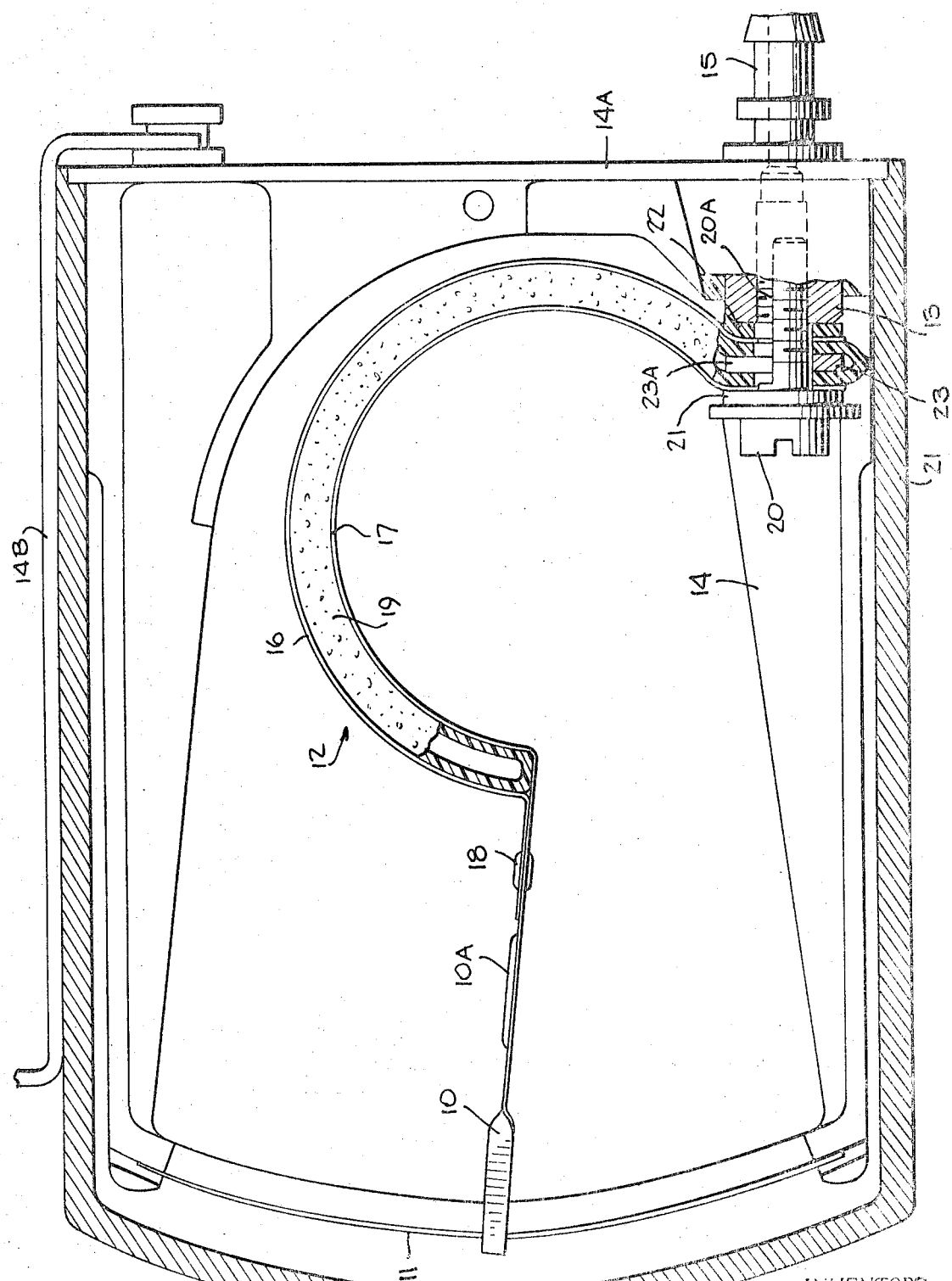

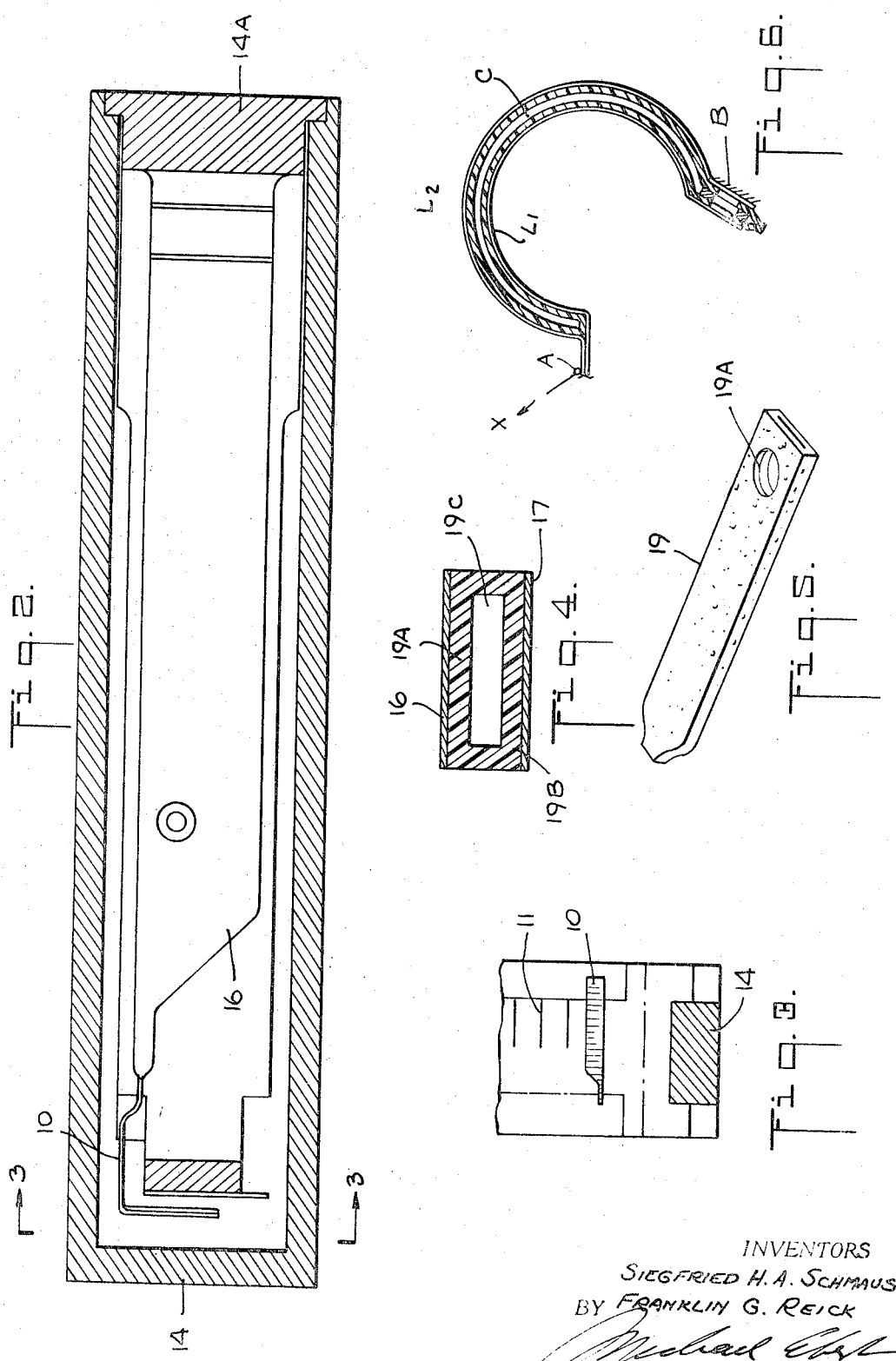

3,732,733

DIRECT-ACTING PRESSURE AND VACUUM SENSOR

RELATED APPLICATION

This application is a continuation-in-part of the co-pending application Ser. No. 000317, filed Jan. 2, 1970.

BACKGROUND OF INVENTION

This invention relates generally to direct-acting pressure and vacuum sensors, and more particularly to a pressure gauge of the elastic type which is operable in the low-pressure range.

Measurement of absolute pressure, gauge pressure, vacuum and draft pressures, and differential pressure, is carried out by two primary types of pressure-sensitive elements, the first being the liquid column in which the height and density of the liquid are utilized to measure pressure, and the second being the elastic pressure device. The sole concern of the present invention is with elastic pressure elements which are designed to follow the physical law that within the elastic limit, stress is proportional to strain; hence deflection is proportional to applied pressure.

The Bourdon tube, because of its stability, simplicity and high pointer torque, is widely used as a pressure or vacuum indicator or controller. The operation of the Bourdon tube is based on the principle that an elastic tube having an internal cross-section that is not a perfect circle, if bent or distorted, has the property of changing its shape with internal pressure variations. This internal pressure causes the cross-sectional form to become more circular, giving rise to a motion of the closed end of the tube if the open end is rigidly fixed. This motion is called "tip travel".

The Bourdon tube comes in three main types. The C-type is formed by winding the tube to define a segment of a circle, whereas the spiral type is created by winding more than one turn of the tube in the shape of a spiral about a common axis. The helical type is created by winding several turns of the tube in the shape of a helix. A Bourdon spring in any of the existing types can be made from any metal or alloy which exhibits satisfactory elastic qualities.

While Bourdon types of the "C", spiral, or helical type are capable of operating within various pressure ranges running as high as 100,000 psi, in no instance is it possible as a practical matter, to operate such tubes below 12 or 15 psi. Hence, despite the advantages of Bourdon tubes, they are not effective as gauges in the low-pressure range.

SUMMARY OF INVENTION

In view of the foregoing, it is the primary object of this invention to provide a direct-acting pressure and vacuum sensor of the elastic type, which is capable of operating in the low-pressure range.

The need for inexpensive pressure sensors in the low-pressure range is widespread. Thus the need exists for such devices in the following applications, among others:

a. pressure gauge for motor-boat speedometer;
b. air Gauge;
c. receiver gauge for process control;
d. low-pressure switches;
e. level indicators;
f. vacuum Gauge A more specific object of the invention is to provide a simple, stable and reliable pressure and vacuum sensor which may be manufactured at low cost, the sensor being responsive to low-level pressure or vacuum values to carry out indicating or control functions.

Briefly stated, these objects are accomplished in an elastic device for sensing or measuring pressure levels, particularly low-pressure levels, the device being constituted by two cantilever springs of different length and spring rate, the two springs having a similar "C" or other curved formation and being maintained one within the other, in spaced relation to define a pressure region. Disposed within the pressure region and abutting the springs is a flexible bladder forming an internal chamber. One end of the two springs is attached to a fixed socket communicating with the internal chamber, the free end of the springs terminating in a common head from which a pointer extends. Fluid fed through the socket to the internal chamber causes deflection of the springs as a function of fluid pressure, thereby shifting the pointer to an extend depending on the level of pressure.

OUTLINE OF THE DRAWING

For a better understanding of the invention, as well as other objects and further features thereof, reference is made to the following detailed description to be read in conjunction with the accompanying drawings, wherein:

FIG. 1 illustrates, in side view, a direct-acting pressure gauge in accordance with the invention;

FIG. 2 is a section taken in the plane indicated by line 2—2 in FIG. 1;

FIG. 3 is a section taken along the line 3—3 in FIG. 2;

FIG. 4 is a section taken through the line 4—4 in FIG. 1;

FIG. 5 is a perspective view of the bladder; and

FIG. 6 illustrates the operating principles of the gauge.

DESCRIPTION OF THE INVENTION

Referring now to the drawing, and more particularly to FIG. 1, there is shown a preferred embodiment of the invention in the form of a 3 to 15 PSI receiver gauge. In the Figure, pointer 10 is shown at the midpoint of an arcuate scale 11, hence at 9 PSI.

The gauge includes a pressure-responsive sub-assembly generally designated by numeral 12, anchored on a socket 13. The socket is supported on the rear wall 14A of a frame 14 covered by a casing 21, the scale 11 being visible through an opening in the front wall of the casing. Socket 13 is coupled to a hose connector 15 projecting from the rear wall of the frame, whereby fluid under pressure may be admitted into the sub-assembly.

A mounting bracket 14B secured to the rear wall 14A of the frame, makes it possible to mount the gauge behind an instrument panel or other display surface. By suitable bracket arrangements, one may mount the gauge at any other desired position.

Sub-assembly 12 is constituted by two flat springs 16 and 17, both having the same width but differing in length, so that the springs, which may be made of any suitable metal or alloy of the types currently employed in Bourdon tubes, have different spring characteristics or spring rates.

Springs 16 and 17, which may be of metallic or plastic material, both have a similar C-formation, the free ends thereof being sharply bent to extend laterally in overlapping relation and being joined together by a rivet 18 serving as the common head of the sub-assembly.

Secured by the rivet 18 to the common head is the stem 10A of pointer 10, so that as the head is deflected as a function of applied pressure, the pointer is shifted along its scale to indicate the level of pressure. In practice, stem 10A may be an extension of spring 16 rather than a separate element. It will be appreciated that various other expedients may be used to indicate the extent of head deflection, which expedients may be non-mechanical or electrical in nature to provide an analog voltage indicative of pressure.

Rivet 18 maintains the springs in spaced relation to define therebetween a pressure region which is occupied by a flexible bladder 19 formed of non-permeable material that abuts the inner surface of both springs. The bladder preferably is fabricated of a material minimizing frictional contact with the springs in the course of deflection.

The other end of springs 16 and 17 is secured to socket 13 by means of a screw 20 that passes through a circular opening 19A (see FIG. 5) in bladder 19. Sealing gaskets 21 and 22 are mounted on the shank of screw 20 on either side of the sub-assembly, and a spacer 23 is interposed between the walls of the envelope, the spacer having a clearance channel 23A therein for passing fluid from the socket into the internal chamber of the bladder. The shank of screw 20 has a flattened portion 20A to permit passage of fluid into the internal chamber.

Because of the different lengths and spring rates of the springs in the sub-assembly including the bladder, the sub-assembly, as in the case of a C-shaped Bourdon tube, is deflected as a function of applied pressure. In an arrangement wherein the inner spring 17 is thin relative to outer spring 16, the device is adapted to act as a vacuum sensor. But when the sub-assembly is intended for use as a gauge for internal pressure applications, the spring arrangement is then reversed, whereby the thinner spring is on the outside while the thicker spring is on the inside. Obviously, in either application, the thinner spring should be kept under tension. In some instances, one may operate with springs of the same thickness.

For purposes of calibration, the effective length of the springs relative to each other, may be adjusted in the manner described in the above-identified co-pending application. It is not necessary to use flat spring material, and in practice the springs may be wirelike or in other cross-sectional configurations, such as trapezoidal. Also, instead of bending the springs into a C-formation, as shown in the Figures, the springs may be caused to assume a spiral or helical formation, with a suitable bladder interposed between the spaced springs.

Bladder 19, as best seen in FIGS. 4 and 5, has a strip formation, and is of sufficient length to occupy the pressure region between springs 16 and 17. The bladder has a rectangular or oblong cross-section defined by substantially parallel upper and lower walls 19A and 19B, separated by an internal chamber 19C. The anchored end 19D of the bladder is cut on either side to form a closure tip which, as shown in FIG. 1, extends below the socket 13, whereas the other or free end 19E is cut at right angles to the long axis of the bladder so that it fits neatly between the free ends of the springs.

The bladder is preferably in the form of a reinforced rubber or neoprene envelope, whose surface is treated to minimize friction with the abutting inner surfaces of springs 16 and 17, for such friction may lead to undesirable hysteresis effects.

In practice, a bladder having these characteristics may be made by means of a mandrel in the form of a piece of Teflon tube having a flat metal tongue inserted therein to cause the tube to assume a flattened formation. A fabric sleeve, preferably woven of Dacron or other oriented, non-reactive, synthetic yarn material of high strength, is slipped over the mandrel and caused thereby to assume a similar shape.

The sleeve is then impregnated with a moisture-curing silicone rubber solution, such as Dow Chemical's 92909 Disperson Coating, and the impregnated sleeve is then placed in a hydrostatic press and subjected to pressure to force the impregnant well into the pores of the fabric.

After the mandrel is withdrawn, the ends of the fabric sleeve are cut to their required shape and are coated with the same solution, to seal off the ends. In order to provide surfaces having exceptionally low-friction characteristics, a uniform layer of minute glass balls is coated onto the faces of the bladder, using the same silicone rubber solution, this time as a binder for the glass balls.

The rounded, smooth glass balls which, in operation, engage the inner surfaces of the springs, act as low-friction bearings. In order to avoid abrasion of the metallic surfaces by the glass balls, these surfaces are coated with Teflon, graphite or other lubricating or high-slippage material. As a consequence, the frictional engagement between the metal springs and the bladder is markedly reduced, and hysteresis effects avoided, whereby despite the simplicity and inexpensive nature of the gauge structure, it is highly accurate.

In order to provide a simple analysis of the gauge action, we now refer to FIG. 6, showing the sub-assembly apart from the frame. The inner spring is represented by $L_1$, and the outer spring by $L_2$. The free end of the springs is joined at the common head A, the other end being anchored at B. Both springs $L_1$ and $L_2$ are uniformly loaded by the internal pressure in bladder C.

Spring $L_2$ being longer, has a larger effective area than $L_1$. Pressure applied internally to bladder C, will impose a load uniformly on springs $L_1$ and $L_2$, causing head A to move in direction X, because of the differential forces applied to common head A. The extent of movement is proportional to applied pressure, this action being linear in that no appreciable degree of friction exists between the surfaces of the springs and the bladder.

While there has been shown and described a preferred embodiment of direct-acting pressure and vacuum sensor in accordance with the invention, it will be appreciated that many changes and modifications may be made therein without, however, departing from the essential spirit of the invention.

We claim:

1. A pressure sensor for fluids, comprising:
   A. first and second cantilever springs having different lengths and spring rates, the first spring being longer than the second spring said springs having similarly-curved formations and being maintained in spaced relation, the second spring being disposed within the first spring, said springs having opposing inner surfaces to define a curved pressure region therebetween, B. a common head interconnecting free ends of the first and second springs, C. a fixed fluid input socket anchoring the other ends of the springs, D. a flexible bladder occupying said curved pressure region and having an internal chamber, external surfaces of said bladder engaging the opposing inner surfaces of said springs, said internal chamber communicating with said fluid input socket to be filled with pressurized fluid causing said bladder to change curvature and impose a load on said springs whereby fluid introduced therein causes deflection of said springs to shift said common head to an extent depending on the level of fluid pressure; and E. means coupled to said head to indicate said level of pressure.

2. A sensor as set forth in claim 1, wherein said springs have a C-formation.

3. A sensor as set forth in claim 2, wherein said indicating means is a pointer whose stem is attached to said common head and is movable along an arcuate scale.

4. A sensor as set forth in claim 3, wherein said scale is disposed on the front end of a rectangular casing whose rear wall supports said socket.

5. A sensor as set forth in claim 4, further including a hose connector projecting from the rear wall of the casing and coupled to said socket.

6. A sensor as set forth in claim 1, wherein said bladder is formed by a reinforced rubber envelope.

7. A sensor as set forth in claim 6, wherein said reinforced rubber envelope is defined by a woven fabric sleeve impregnated with silicone rubber.

8. A sensor as set forth in claim 6, wherein said envelope has a layer of minute glass balls bonded to the external surfaces thereof to reduce friction with the surfaces of the springs engaged thereby.

9. A sensor as set forth in claim 8, wherein the surfaces of the springs engaged by the balls are coated with a high-slippage substance.

* * * * *